Nov. 24, 1936.  G. E. McLAGAN  2,061,771
SLIP
Filed April 4, 1936  2 Sheets-Sheet 1
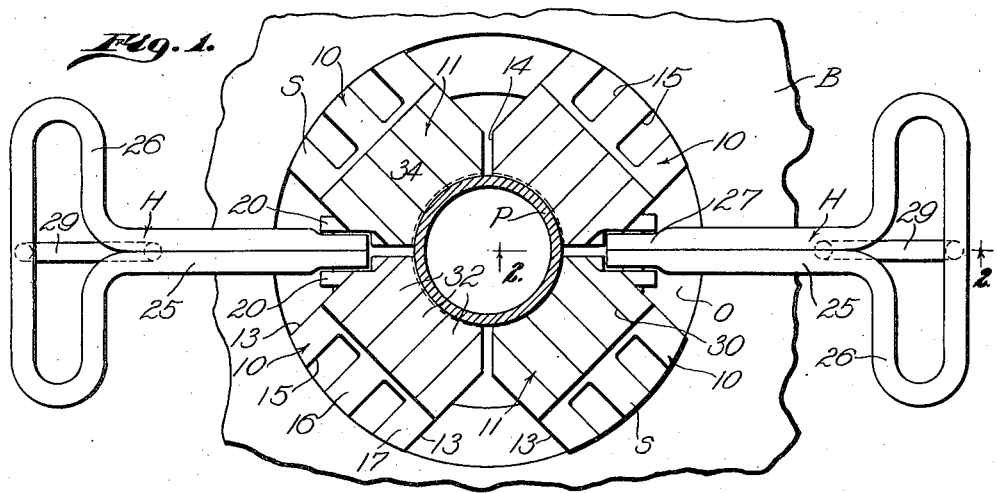
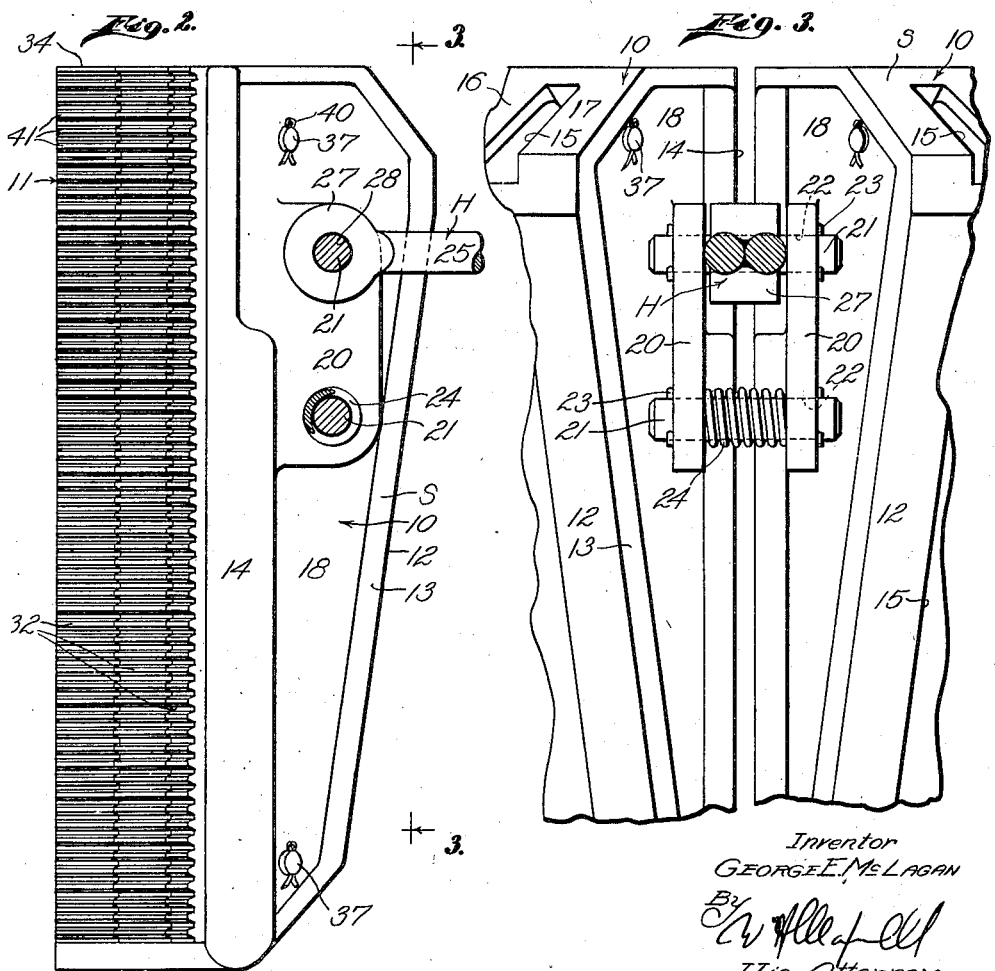
Inventor
GEORGE E. McLAGAN
By
His Attorney Nov. 24, 1936.  G. E. McLAGAN  2,061,771
SLIP
Filed April 4, 1936  2 Sheets—Sheet 2
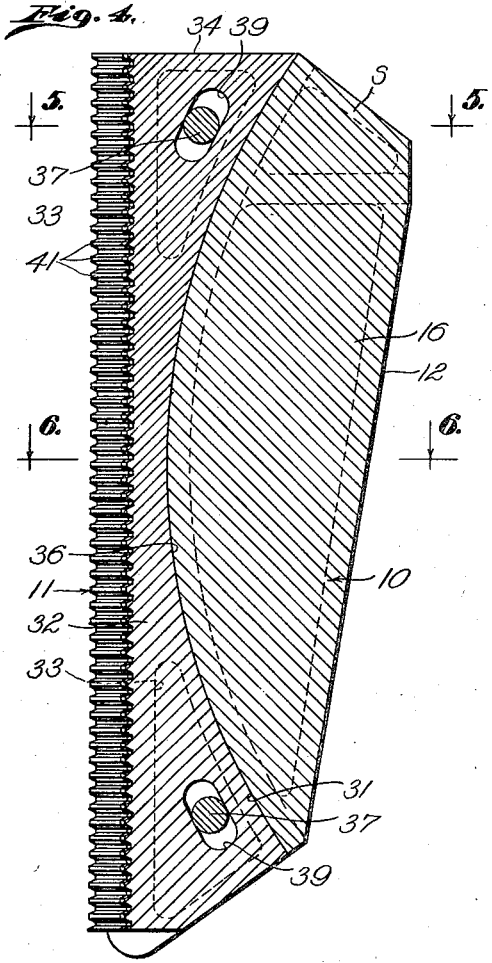
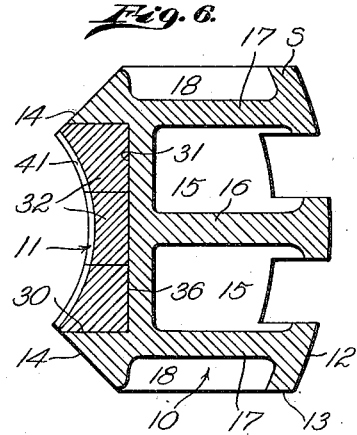
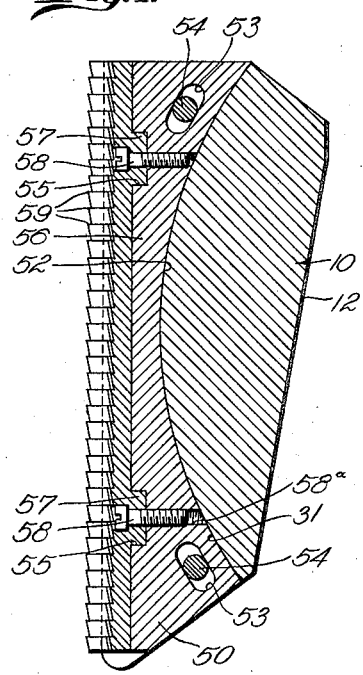
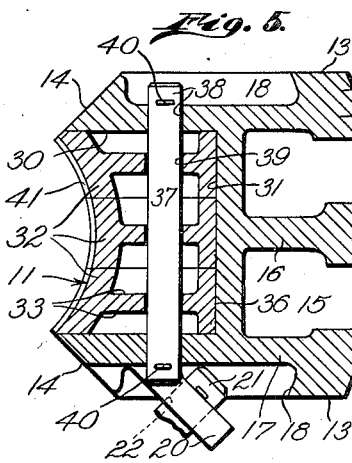
Inventor
GEORGE E. McLAGAN
By
His Attorney Patented Nov. 24, 1936

2,061,771

UNITED STATES PATENT OFFICE 2,061,771

SLIP

George E. McLagan, Monterey Park, Calif.

Application April 4, 1936, Serial No. 72,727

12 Claims. (Cl. 24—263)

This invention relates to well drilling apparatus and relates more particularly to slips for use in the rotary table of a rotary well drilling rig. A general object of this invention is to provide simple, effective and commercially practical slips of the character mentioned that are self-aligning or self-adjusting.

Another object of this invention is to provide slips for use in a rotary table bushing that are operable to obtain tight, uniform and effective gripping engagement with the tubing or pipe under all conditions of use and operation.

Another object of this invention is to provide slips of the character mentioned that are self-adjusting to properly and dependably grip the pipe or tubing when employed in a rotary table bushing that is worn or irregular or that is carried in a rotary table that is not horizontal. The slips of this invention are effective in obtaining a secure gripping engagement with the pipe when used in situations where the usual or typical slips are not altogether satisfactory.

Another object of the invention is to provide slips of the character mentioned that embody self-equalizing and self-adjusting pipe gripping members that are adapted to securely and dependably grip the pipe when the slips are used under unfavorable conditions such as situations where the rotary table is not horizontal, etc.

Another object of the invention is to provide slips of the character mentioned that are segmental or sectional comprising sections connected for relative movement to individually shift so as to conform to and properly bear on the internal wall of the rotary table bushing.

Another object of this invention is to provide slips of the character mentioned in which the pipe gripping liners or members are readily removable for replacement or repair.

A further object of this invention is to provide slips of the character mentioned that are inexpensive of manufacture and that are easy and convenient to handle.

The various objects and features of my invention will be fully understood from the following detailed description of typical preferred forms and applications of the invention, throughout which description reference is made to the accompanying drawings, in which:

Fig. 1 is a top or plan view of a portion of a rotary table bushing illustrating a set of slips of the character provided by this invention arranged in the bushing to grip a pipe. Fig. 2 is an enlarged vertical detailed sectional view taken substantially as indicated by line 2—2 on Fig. 1, illustrating one of the slip sections in side elevation. Fig. 3 is a vertical detailed sectional view taken substantially as indicated by line 3—3 on Fig. 2 illustrating portions of the outer side of the slip in elevation. Fig. 4 is a vertical detailed sectional view of one of the sections of a slip. Figs. 5 and 6 are transverse detailed sectional views taken as indicated by lines 5—5 and 6—6, respectively, on Fig. 4, and Fig. 7 is a vertical detailed sectional view of a form of the invention including replaceable gripping parts on the self-adjusting elements.

The present invention relates to the type of slips described in my co-pending application entitled Slips, filed on an even date herewith, said co-pending application specifically claiming a slip body section having a concave surface and a gripping element cooperating with said surface.

Fig. 1 of the drawings illustrates a set of slips S provided by this invention arranged in the opening O of a rotary table bushing B. In accordance with the usual practice the wall of the bushing opening O is inclined downwardly and inwardly to carry the slips. The particular set of slips S illustrated comprises two slips, it being understood that the invention may be employed in sets of three or more slips S. As the two slips S illustrated are identical I will proceed with a detailed description of one slip, it being understood that such description may apply to the other slip of the set.

The slip S provided by this invention, and illustrated in Figs. 1 to 6, inclusive, includes, generally, two body sections 10 connected for limited relative horizontal movement and self-adjusting gripping elements 11 carried by the sections 10 to grip a pipe P.

The body sections 10 are connected to form a single slip S which may be handled as a unit. The two body sections 10 are complementary and alike in construction and shape. Each section 10 has a downwardly and inwardly inclined outer surface 12 which is convex and formed to bear on the inclined wall of the opening O. The sides 13 of the sections 10 are vertical while the inner sides of the sections are shaped to carry the gripping elements 11 as will be hereinafter described. The inner corner surfaces 14 of the sections 10 are vertical and are substantially radial with respect to the central longitudinal axis of the bushing opening O. The surfaces 14 on the outermost sides of the connected sections 10 are adapted to engage the corresponding surfaces 14 on the other slip S of the set. The body sections 10 are preferably socketed or relieved so as to be light in weight and inexpensive of manufacture. In the preferred construction illustrated in the drawings two spaced longitudinally or vertically extending recesses 15 are provided in the outer side or surface 12 of each section 10 leaving a central web or rib 16 and two side ribs 17. The opposite sides 13 of the sections 10 may have recesses or cavities 18. The upper and lower corners of the sections 10 are preferably bevelled as illustrated throughout the drawings. The upper ends of the sections 10 may be flat and substantially horizontal.

The body sections 10 of the slip S are connected for limited relative longitudinal movement. The means for connecting the two sections 10 includes vertical ribs or flanges 20 on the opposing sides 13 of the sections. Bolts or pins 21 extend through and are shiftable in horizontal openings 22 in the flanges 20. In the particular structure illustrated there are two spaced pins 21 for connecting the two sections 10. The pins 21 project outwardly beyond the flanges 20 and keys 23 are provided on the projecting parts of the pins to retain the pins in position and to limit the relative outward movement of the sections 10. A spring 24 surrounds the lower pin 21 and is arranged under compression between the flanges 20 to yieldingly urge the sections apart.

A handle is provided for facilitating the carrying and manipulation of the slip S. The handle H may comprise a length of rod stock bent or shaped to have a stem 25 and a head 26. The head 26 is laterally widened or projects laterally from the handle stem 25 and is formed to be readily engaged by the drillers or users. The two rod portions forming the stem 25 have their inner parts 27 flattened to extend between the flanges 20 with suitable clearance. Openings 28 in the parts 27 receive the upper pin 21 so that the pin connects the handle with the slip S for pivotal movement. The parts 27 have sufficient clearance with the flanges 20 to permit the required relative movement between the body sections 10. A downwardly projecting leg or rest 29 is provided on the head 26 of the handle to support the head above the rotary table or the bushing B for ready engagement.

The inner sides of the body sections 10 are each provided with a socket or recess 30 to carry a gripping element 11. The opposite side walls of the recesses 30 are preferably flat and vertical. The recesses 30 may extend between the upper and lower ends of the sections 10. In accordance with the invention the inner walls 31 of the recesses 30 are convex. Each surface or wall 31 is curved about a single point or line of curvature, being cylindrically curved and smooth and regular throughout its extent. It is preferred that the convex walls 31 have a comparatively large radius of curvature.

The gripping elements 11 are features of the present invention being automatically adjustable to properly grip a vertical pipe P extending through the bushing B under various conditions of operation. The gripping elements 11 are preferably, though not necessarily, laminated. In the preferred form of the invention disclosed in the drawings each element 11 comprises a laminated assembly of three plate-like members 32. The members 32 are vertically arranged in the recesses 30 in side by side relation. The outer sides of the outermost members 32 are adapted to have sliding bearing engagement with the side walls of the recesses 30 while the opposing sides of the members are adapted to have sliding cooperation with one another. The sides of the members 32 may be recessed or provided with cavities 33 to lighten the weight of the members. The upper ends 34 of the members 32 are preferably flat and are flush with the upper ends of the body sections 10 when the members are in their normal or intermediate positions. The lower ends 35 of the members 32 are bevelled downwardly and inwardly so that they do not interfere with the wall of the bushing opening O when the members rock or shift. The outer surfaces 36 of the gripping members 32 cooperate with the walls 31 of the recesses 30 and are concave to conform to the recess walls. The curvature of the surfaces 36 is such that the surfaces shiftably bear on the walls 31 throughout their entire extent. The surfaces 36 are cylindrically concaved and are smooth and regular to have free sliding engagement with the recess walls 31. The surfaces 36 being shiftable or slidable on the walls 31 as just described permit or provide for rocking movement or shifting of the members 32 about substantially horizontal axes.

Means is provided for removably retaining the gripping members 32 in the recesses 30 and for limiting the extent of their movement. Pins 37 are arranged in openings 38 in the upper and lower portions of the body sections 10 and extend transversely through the recesses 30. Elongate openings or slots 39 in the members 32 receive the pins 37. The slots 39 are concentric with the surfaces 36 or are tangential to circles concentric with the surfaces 36. The slots 39 receive the pins 37 with clearance and are sufficiently long to allow for the required movement of the members 32. The end portions of the pins 37 may project into the recesses 18. In accordance with the invention the pins 37 are removable to permit the removal or detachment of the members 32. The means for removably retaining the pins 37 in position may comprise cotter keys 40 arranged through transverse openings in the projecting outer portions of the pins 37. The pins 37 are engageable by the ends of the slots 39 to limit the rocking or movement of the members 32 relative to the sections 10.

The inner exposed edges or surfaces of the gripping members 32 are shaped to conform to the pipe P and are provided with means for gripping the pipe. The active inner edges of the plate-like members 32 are normally or initially vertical and are concave to conform to the cylindrical pipe P. Teeth or gripping parts 41 are provided on the inner edges or surfaces of the members 32 to grip the pipe P. The teeth 41 may be in the form of horizontal ridges having flattened or blunt outer faces for cooperating with the pipe. The teeth 41 of the several members 32 forming each gripping element 11 may be aligned or may be staggered or offset with relation to one another to obtain a more effective engagement with the pipe P. It is to be understood that the shape and character of the gripping teeth 41 may be varied to suit operating conditions, etc.

In using or operating the slips S of this invention the slips are carried or moved about by means of the handles H and are inserted in the bushing opening O in the usual manner to engage about the pipe P extending vertically through the bushing. The inclined outer surfaces 12 of the sections 10 cooperate with the inclined wall of the opening O to cause the slips to move inwardly so that the gripping teeth 41 contact the pipe P. When the weight of the pipe P is imposed on the slips S the gripping parts 41 are very tightly forced against the pipe to grip the same. In the event that the bushing B or the rotary table carrying the bushing is not truly horizontal the engagement of the gripping teeth 41 with the vertical pipe P causes the members 32 to rock or move to a position where their series of teeth 41 are vertical to properly and evenly engage the pipe. The surfaces 36 readily slide on the recess walls 31 during such shifting of the members 32 and the curvature of the surfaces and walls is such that the members move about horizontal axes. Thus the gripping elements 11 comprising the members 32 are automatically adjusted to properly and securely grip the pipe P. The elements 11 are self-adjusted in the same manner when the opening O in the bushing is worn or irregular. It will be noted that the members 32 are individually shiftable to more readily conform to the pipe P. The teeth 41 in having broad continuous active surfaces have extensive engagement with the pipe to securely and dependably hold the pipe without scoring or mutilating it. The body sections 10 are connected for limited relative movement by pins 21 so that the individual segments or sections of the slips may move with respect to one another and thus readily conform to the bushing opening O. This adjustability of the sections 10 coupled with the adjustability of the gripping members 32 provides for the even effective engagement of the gripping members with the pipe P. The liners or members 32 in being shifted to vertical positions through contact with the vertical pipe assure the proper operation of the slips under all operating conditions. The members 32 may be easily removed for replacement or repair by removing the pins 37. The parts are all simple, light in weight and inexpensive of manufacture.

Fig. 7 of the drawings illustrates a form of the invention in which the self-adjusting elements have removable pipe gripping parts. Fig. 7 illustrates only one body section 10, of a slip S, and its gripping element, it being understood that the slip S may include two sections 10, as described above. The body section 10 may be substantially identical with the section 10 of the previously described form of the invention, having an inclined outer surface 12 for bearing in the bushing opening O and a recess in its inner side having a convex inwardly facing wall 31. The gripping element may be an integral part or may be made up of a plurality of plate-like members arranged in side by side relation in the recess of the body section 10. In the present instance it will be considered that the gripping element embodies a plurality of plate-like members 50 similar to the members 32. The members 50 have concave surfaces 52 at their outer edges for shiftably bearing on the wall 31. Elongate openings or slots 53 are provided in the opposite end portions of the members 50 to pass pins 54 which connect the members 50 with the section 10 for limited movement. The inner surfaces of the members 50 are vertical and are provided with spaced notches 55.

Removable pipe gripping parts 56 are provided on the inner faces or edges of the members 50. The pipe gripping parts 56 are elongate and are adapted to seat or bear on the forward edges of the members 50. Lugs 57 are provided on the parts 56 to fit in the notches 55. Screws 58 are passed through openings in the lug portions of the gripping parts 56 and are threaded in openings 58ª in the members 50 to detachably secure the parts 56 to the members. The heads of the screws 58 are countersunk in the active or inner surfaces of the parts 56. Teeth 59 are provided on the parts 56 for gripping the pipe handled by the slips. In the particular case illustrated the teeth 59 are relatively sharp and face upwardly and inwardly to have effective gripping engagement with the pipe. The form of slip illustrated in Fig. 7 of the drawings operates in the same manner as the previously described embodiment of the invention. It will be apparent how the gripping parts 56 may be easily removed from the members 50 for sharpening, repair or replacement.

Having described only typical preferred forms and applications of my invention, I do not wish to be limited or restricted to the specific details herein set forth, but wish to reserve to myself any variations or modifications that may appear to those skilled in the art or fall within the scope of the following claims:

Having described my invention, I claim:

1. A slip of the character described including a body having a recess in its inner side, the recess presenting a convex wall, and a pipe gripping member arranged in the recess and having a concave surface shiftably bearing on said wall whereby the member may move about a substantially horizontal axis to grip a vertical pipe.

2. A slip of the character described including a body having a recess in its inner side, a wall of the recess being convex, a pipe gripping member in the recess having a concave surface shiftably cooperating with said wall to rock about a substantially horizontal axis, and means retaining the member in the recess for limited movement.

3. A slip of the character described, including a body having a recess in its inner side, the recess presenting a convex wall, a pipe gripping member in the recess having a concave surface shiftably cooperating with said wall to rock about a substantially horizontal axis, and means retaining the member in the recess for limited movement, said means including a pin on the body received in an elongate opening in the member.

4. A slip of the character described including a body having a recess in its inner side, a wall of the recess being convex, a member in the recess, a concave surface on the member shiftably engaging said wall whereby the member may rock about a substantially horizontal axis, and gripping parts on the member for contacting a pipe.

5. A slip for use in the tapered opening of a rotary table bushing including two body sections, each section having a downwardly and inwardly inclined outer surface to seat in said opening and having a convex inner surface, means connecting the sections for limited relative movement, and pipe gripping members on the sections having concave surfaces shiftably cooperating with the convex body surfaces to be movable about horizontal axes.

6. A slip for use in the tapered opening of a rotary table bushing including a body section having a downwardly and inwardly inclined outer surface to seat in said opening and having an inwardly facing convex surface, and a shiftable pipe gripping member having a concave surface cooperating with said convex surface to be self-adjusting and to conform to the disposition of the pipe.

7. A slip for use in the tapered opening of a rotary table bushing including two body sections, each section having a downwardly and inwardly inclined outer surface to seat in said opening and having a convex inner surface, means connecting the sections for limited relative movement, pipe gripping members connected with the sections for limited relative movement, parts on the members for engaging a pipe, and concave outwardly facing surfaces on the members shiftably bearing on the said convex surfaces whereby the members are self-adjustable through contact with the pipe.

8. A slip for use in the tapered opening of a rotary table bushing including a body section having a downwardly and inwardly inclined outer surface for seating in said opening and having a convex inner surface, a pipe engaging member at the inner side of the section, means detachably connecting the member with the section for limited movement, and an outwardly facing concave surface on the member slidably bearing on the convex surface whereby the member is self-adjusting to a vertical position through contact with the pipe.

9. A slip of the character described including a body section having an inwardly facing convex surface, a pipe engaging member at the inner side of the section, means detachably connecting the member with the section for limited movement, said means including a pin removably carried by the section and passing through an opening in the member, and an outwardly facing concave surface on the member slidably bearing on the convex surface whereby the member is self-adjusting to a vertical position through contact with the pipe.

10. A slip of the character described including a body section having an inwardly facing convex surface, a member having a concave surface shiftably engaging the first mentioned surface, and a replaceable pipe gripping part on the member.

11. A slip of the character described including a body having a recess in its inner side, the outer wall of the recess being convex, a plurality of vertically disposed members arranged in side by side relation in the recess and having concave surfaces shiftably engaging said wall whereby the members may move about a substantially horizontal axis, and pipe gripping means on the members.

12. A slip of the character described including a body having a recess in its inner side, a wall of the recess being convex, and pipe gripping means including a laminated gripping element in the recess whose laminae have concave surfaces shiftably bearing on said wall.

GEORGE E. McLAGAN.